(12) United States Patent
Fujino et al.

(10) Patent No.: US 6,173,418 B1
(45) Date of Patent: Jan. 9, 2001

(54) COMPUTER FOR GATHERING LOG DATA

(75) Inventors: Shuji Fujino, Ebina; Kazuyoshi Morikawa, Chigasaki; Akihiro Urano; Hidetomo Nakano, both of Fujisawa, all of (JP); Shinji Morita, Lexington, MA (US); Mitsugu Yamada, Yokohama (JP); Miki Niimura, Ebina (JP)

(73) Assignee: Hitachi, Ltd., Tokyo (JP)

( * ) Notice: Under 35 U.S.C. 154(b), the term of this patent shall be extended for 0 days.

(21) Appl. No.: 09/058,890

(22) Filed: Apr. 13, 1998

(30) Foreign Application Priority Data

Apr. 18, 1997 (JP) .................................... 9-101210

(51) Int. Cl.$^7$ .................................... G06F 11/00
(52) U.S. Cl. .................................... 714/20
(58) Field of Search .................................... 714/15, 16, 19, 714/20, 274, 795; 709/212, 213, 220, 223, 232

(56) References Cited

U.S. PATENT DOCUMENTS

| | | | |
|---|---|---|---|
| 4,878,167 | * 10/1989 | Kapulka et al. | 714/16 |
| 5,293,323 | * 3/1994 | Doskocil et al. | 714/25 |
| 5,465,328 | * 11/1995 | Dievendorff et al. | 714/15 |
| 6,038,253 | * 3/2000 | Shimazaki | 714/994 |

* cited by examiner

Primary Examiner—Robert W. Beausoliel, Jr.
Assistant Examiner—Pierre Eddy Elisca
(74) Attorney, Agent, or Firm—Antonelli, Terry, Stout & Kraus, LLP

(57) ABSTRACT

A computer for gathering log data includes a device for normalizing the log data by cutting out values corresponding to pre-defined data items from log data in log files of respective computers on the alert and re-arranging the values of data items defined, and storing the normalized log data therein and a device for gathering the stored normalized log data into a computer having a manager function. Further, when the normalized log data have log data output times corrected on the basis of a time of the computer having the manager function, the normalized log data are stored in order of the corrected log data output times.

9 Claims, 19 Drawing Sheets

FIG. 10

FILE INFORMATION CLASS 305

| FILE NAME | | |
|---|---|---|
| AFTER ALTERATION | CREATION TIME | |
| | FINAL MODIFICATION TIME | |
| | FINAL ACCESS TIME | |
| | i-node NUMBER | |
| | ACCESS PERMISSION | |
| | UID | |
| | GID | |
| | SIZE | |
| BEFORE ALTERATION | CREATION TIME | |
| | FINAL MODIFICATION TIME | |
| | FINAL ACCESS TIME | |
| | i-node NUMBER | |
| | ACCESS PERMISSION | |
| | UID | |
| | GID | |
| | SIZE | |

FIG. 11

TRAFFIC INFORMATION CLASS 306

| NUMBER OF RECEIVING BYTES |
|---|
| NUMBER OF SENDING BYTES |
| PROCESSING TIME |

FIG. 12

INDIVIDUAL INFORMATION CLASS 307

| MESSAGE TEXT |
|---|

FIG. 13

DATA STORAGE CLASS 314

| T1 | L1 | V1 (AREA FOR SPECIFYING EXISTENT INFORMATION CLASSES) | | | | | |
|----|----|----|----|----|----|----|----|
| | | T2 | L2 | V2 | T5 | L5 | V5 | ...... |

FIG. 14

CODE TABLE FOR NORMALIZED ITEMS 600

| NORMALIZED ITEMS | CONTENTS | CODE |
|---|---|---|
| LOG EVENT | LOGIN | 1 |
| | SU (ALTERATION BY USERS) | 2 |
| | CONNECT | 3 |
| | FILE | 4 |
| | JOB | 5 |
| | MAIL | 6 |
| RESULT OF LOG EVENT | SUCCESS | 0 |
| | FAILURE | 1 |
| ACCESS RIGHT | POSSESSED | 0 |
| | NOT POSSESSED | 1 |
| ACCESS RESULT | SUCCESS | 0 |
| | FAILURE | 1 |
| ACCESS PERMISSION | POSSESSED | 0 |
| | NOT POSSESSED | 1 |

FIG. 15

MANAGER RULE 450

- DB_MAX : PRESERVATION PERIOD OF NORMALIZED LOG DATA ; — 451
- RULE_MAX : MAXIMUM MULTIPLEXING FACTOR OF RULE DISTRIBUTION ; — 452
- LOG_MAX : MAXIMUM MULTIPLEXING FACTOR OF LOG GATHERING ; — 453

FIG. 16

RULE ON OPERATION CONDITIONS 470

- MANAGER_ADDRESS : IP ADDRESS OF MANAGER ; — 471
- FILE_MAXSIZE : MAXIMUM SIZE OF NORMALIZED FILE ; — 472

FIG. 17

RULES ON LOG FILES ON THE ALERT 500

TARGET_LOG : "NAME OF LOG FILES ON THE ALERT 1",
    FORMAT = SEQ, INTERVAL = TIME INTERVAL,
    FMT_NAME = "NAME OF FORMAT RULE";

TARGET_LOG : "NAME OF LOG FILES ON THE ALERT 2", FORMAT = WRAP,
    INTERVAL = TIME INTERVAL;

FIG. 18

FORMAT RULE (PART 1) 510

FMT_T : REGTEXT = "CHARACTER STRING 1" | LOG EVENT = "1" | RESULT OF LOG EVENT = "0" :
NORMALIZED ITEMS 1 [ NUMBER OF CHARACTERS ] : NORMALIZED ITEMS 2 [ TERMINATION CHARACTER ] : ⋯ ;

FMT_T : REGTEXT = "CHARACTER STRING 2" && REGTEXT = "CHARACTER STRING 3" | LOG EVENT = "3" | RESULT OF LOG EVENT = "1":
NORMALIZED ITEMS 1 [ TERMINATION CHARACTER ] : SKIP [ NUMBER OF CHARACTERS SKIPPED ] : NORMALIZED ITEMS 4 [ NUMBER OF CHARACTERS ] : ⋯ ;

FIG. 19

FORMAT RULE (PART 2) 515

FMT_B : REGTEXT = "CHARACTER STRING 5" && REGTEXT = "CHARACTER STRING 6" | LOG EVENT = "2" | RESULT OF LOG EVENT = "1" : NORMALIZED ITEMS 1 [ TERMINATION CHARACTER ] : SKIP [ "DELIMITATION CHARACTER ] : NORMALIZED ITEMS 3 [ NUMBER OF CHARACTERS ] : ⋯ ;

FIG. 20

FILTERING RULE 520

FLT : NORMALIZED ITEMS 1 = "CHARACTER STRING 1" ;

FLT : NORMALIZED ITEMS 2 = "CHARACTER STRING 2" | | NORMALIZED ITEMS 3 = "CHARACTER STRING 3" ;

FLT : NORMALIZED ITEMS 4 = "CHARACTER STRING 4" && NORMALIZED ITEMS 5 ! = "CHARACTER STRING 5" ;

FLT : NORMALIZED ITEMS 6 = "TIME 1" - "TIME 2" && NORMALIZED ITEMS 7 = "CHARACTER STRING 7" ;

FIG. 21

EXAMPLES OF MESSAGE TEXT

SU 01/30 11 : 18 + ttyp5 fujino-root — 551
SU 01/31 11 : 52 - ttyp7 morita-abc — 552

Jan  4 12 : 36 : 10 hosta ftpd [ 1111 ] : connect from 178. 213. 252. 12 — 553
Jan 12 13 : 12 : 15 hostb ftpd [ 1111 ] : refused connect from hostb — 554
Jan 18 15 : 10 : 55 hostc ftpd [ 7777 ] : connect to hosta — 555

Jan 25 10 : 12 : 34 hosta job [ 2222 ] : JOB ABC STARTED — 556
Jan 25 10 : 15 : 10 hosta job [ 2222 ] : JOB ABC IN ABNORMAL TERMINATION — 557

550

COMPUTER FOR GATHERING LOG DATA

BACKGROUND OF THE INVENTION

The present invention relates to a system wherein a manager gathers log data from agents through a network, and in particular to a log data gathering and management system wherein a manager manages log data existing within the system on the basis of common log data formats.

An operating system (OS) and application programs executed or run on an information processor output various log information therefrom. Several methods for gathering the output log information are known generally. For example, Japanese Patent Application Laid-Open No. Hei 5-250229 discloses a log data gathering technique for detecting error codes in log data upon gathering log data from a plurality of computers to thereby preferentially transmit log data outputted from a computer placed in an error state. Furthermore, Japanese Patent Application Laid-Open No. Hei 5-28008 discloses a log information gathering system for detecting that the number of log information stored in storage means has reached a predetermined number when an information processing system gathers failure logs, and suppressing log registration to thereby prevent important failure information from missing. Moreover, Japanese Patent Application Laid-Open No. Hei 6-111029 discloses a data gathering technique for respectively adding times at which data outputted from low-order terminal equipment have been gathered, to data and transferring same to an upper control device to thereby prevent impairment of a time-sequential relationship between respective data outputted from a plurality of terminals.

In a distributed processing system wherein a plurality of computers are connected to one another through a network and processing is executed or implemented while the computers are communicating with other computers respectively, one user is able to access a plurality of widespread computers and files. Accordingly, the centralization of log data outputted from individual computers to a central computer and the storage of the log data in a database are necessary to analyze the log data to thereby detect an unauthorized access to the computers or files. However, since log data outputted from various system programs or application programs are respectively different in data format from one another, the mere gathering and centralization of the log data outputted from the individual computer programs make it difficult to analyze the log data. Since the times held by the individual computers are not necessarily coincident with one another over all the computers, the times applied to individual log data are generally shifted from each other. It is thus difficult to arrange the intensively-set log data in order of the proper times.

SUMMARY OF THE INVENTION

With the foregoing in view, it is therefore an object of the present invention to manage log data normalized in common data format.

It is another object of the present invention to manage log data on the basis of the time of a central computer for gathering log data from computers at the respective sites.

In order to achieve the above objects, the present invention provides a computer for gathering log data, which has, as processing means of agents, means for creating and storing normalized log data in which values corresponding to pre-defined data items are cut out from log data in log files on the alert to arrange the values of normalized data items, and means for transmitting the stored normalized log data to a computer executing a manager function through a network.

Further, the present invention provides a computer for gathering and managing log data, which has, as processing means of a manager, means for receiving log data normalized in accordance with pre-defined common data formats and having log output times each corrected based on a reference time of the manager, from computers executing functions of agents through a network, and means for storing the normalized log data in a database in order of the corrected times.

According to the present invention, as has been described above, each of agents monitors a plurality of log files and inputs log data outputted in various formats. Thereafter, the agent normalizes the log data and converts the same into common data formats. Further, since only necessary log data is extracted and corrected times matched with a manager time are used as log data output times, an administrator is able to analyze log data outputted from a plurality of computers existing in a network on the basis of unified data formats and times.

With respect to log data stored in the manager, log data corresponding to a predetermined period is preserved. It is therefore possible to restrict the total amount of stored log information by deleting the same in order from the past log data.

Further, since the gathered log data can be retrieved according to corrected times and normalized items, the administrator can easily obtain necessary log information.

BRIEF DESCRIPTION OF THE DRAWINGS

Other objects and advantages of the present invention will be more clearly understood from the following detailed description, taken in conjunction with the accompanying drawings wherein:

FIG. 10 is a diagram showing a data structure of a file information class employed in the embodiment shown in FIG. 1;

FIG. 11 is a diagram illustrating a data structure of a traffic information class employed in the embodiment shown in FIG. 1;

FIG. 12 is a diagram depicting a data structure of an individual information class employed in the embodiment shown in FIG. 1;

FIG. 13 is a diagram showing a data structure of a data storage class employed in the embodiment shown in FIG. 1;

FIG. 14 is a diagram illustrating an example of a code table for normalized items;

FIG. 15 is a diagram depicting an example of a manager rule;

FIG. 16 is a diagram showing an example of a rule on operation conditions of an agent;

FIG. 17 is a diagram illustrating an example of rules on log files on the alert of the agent;

FIG. 18 is a diagram depicting an example of a format rule (part 1) of the agent;

FIG. 19 is a diagram showing an example of a format rule (part 2) of the agent;

FIG. 20 is a diagram illustrating an example of a filtering rule of the agent;

FIG. 21 is a diagram depicting examples of message texts stored as log data in the log files on the alert;

DETAILED DESCRIPTION OF THE PREFERRED EMBODIMENT

One embodiment of the present invention will hereinafter be described in detail with reference to the accompanying drawings.

Figure 1:
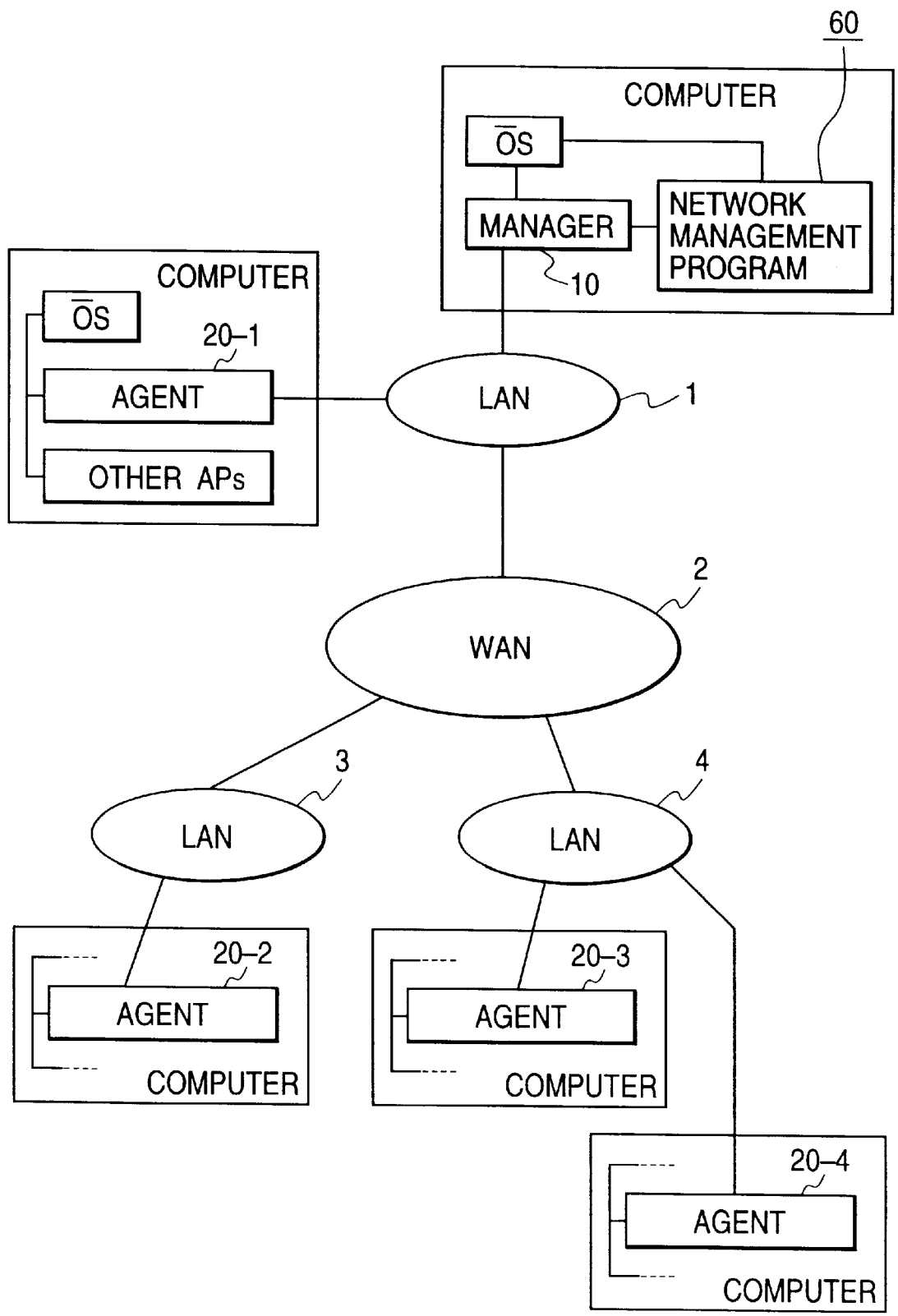
FIG. 1 is a diagram showing a configuration of a network system according to an embodiment of the present invention.

FIG. 1 is a system configurational diagram showing one example of a communication network to which the present invention is applied. The network is a coupled one consisting of a plurality of LANs 1, 3 and 4 and a WAN (Wide Area Network) 2. A manager 10 is an application program (AP) stored in a main storage of a computer and run under OS control. Agents 20-1, 20-2, 20-3 and 20-4 are APs each stored in a main storage of a computer such as a server or the like and run under OS. The manager 10 is capable of communicating with the agents 20-1, 20-2, 20-3 and 20-4 through the LANs 1, 3 and 4 and the WAN 2. As shown in the drawing, a computer for running each individual agent 20 is capable of running other APs in parallel with the agent 20. The computer for executing the manager 10 is also capable of running other APs in parallel with the manager 10. It is however desirable that a dedicated computer is assigned to the manager to ensure sufficient cPu performance and resources. Reference numeral 60 indicates a network management system for managing the network system, which comprises a network management program and an unillustrated network monitoring terminal. The network management system 60 provides the manager 10 with information concerning network resources.

Figure 2:
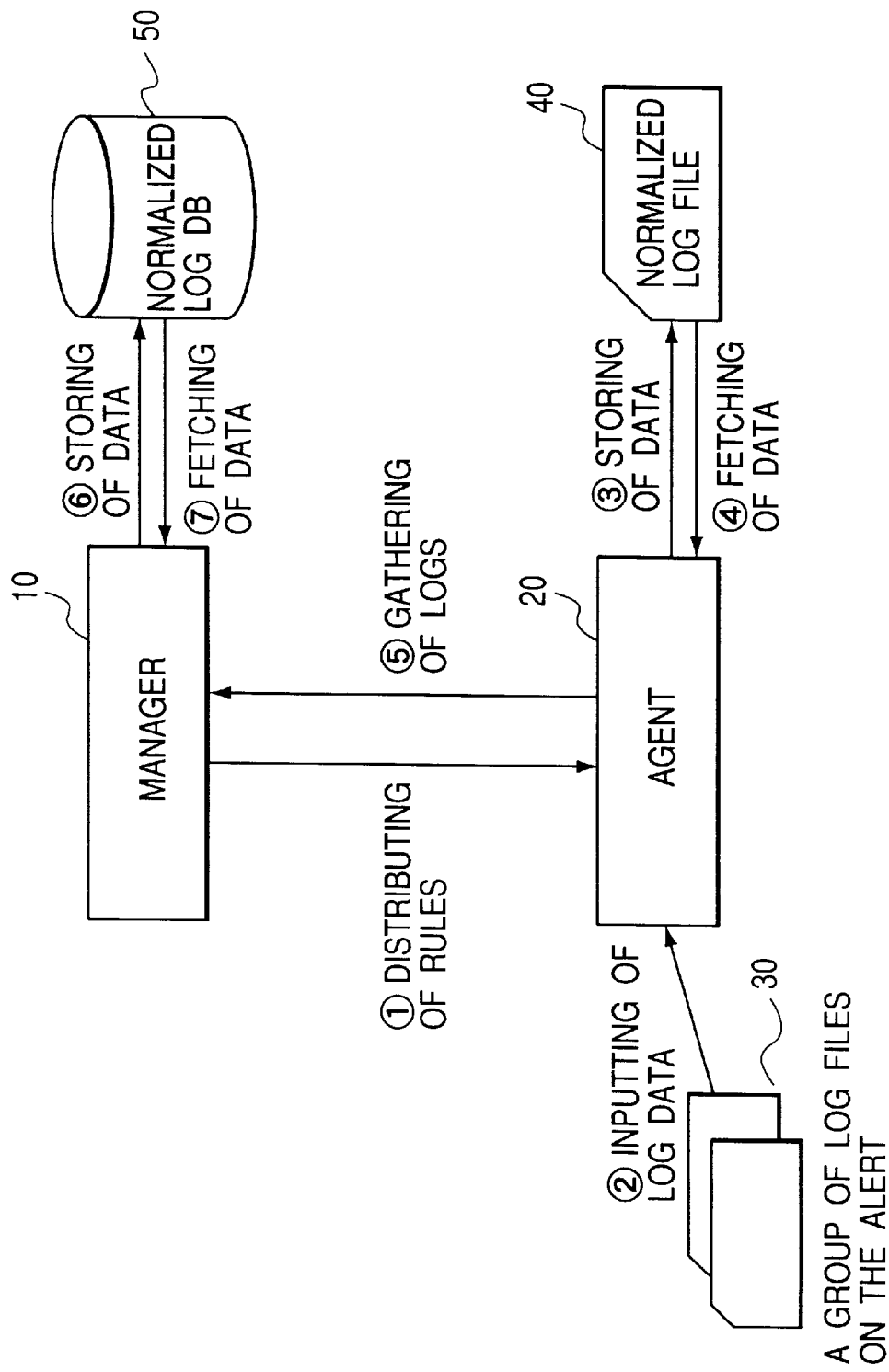
FIG. 2 is a diagram schematically illustrating process operations to be performed by a manager and an agent employed in the embodiment shown in FIG. 1.

FIG. 2 is a diagram schematically showing processing operations to be performed by a manager and an agent. The manager 10 distributes defined various rules to its corresponding agent 20 (①). The agent 20 registers the received rules therein, inputs log data from a group of log files on the alert 30 in accordance with the rules (②) and normalizes the log data, followed by storing to a normalized log file 40 (③) At this time, log output times in the normalized log data are respectively corrected based on corrected times with the time of the manager 10 as the reference. When a log gathering request is issued from the manager 10, the agent 20 fetches the normalized log data from the normalized log file 40 (④) and transfers it to the manager 10 (⑤). The manager 10 stores the gathered normalized log data on a normalized log database 50 in order of corrected times (⑥). Further, the manager 10 extracts arbitrary normalized log data from the normalized log database 50 as necessary and analyzes it.

Figure 3:
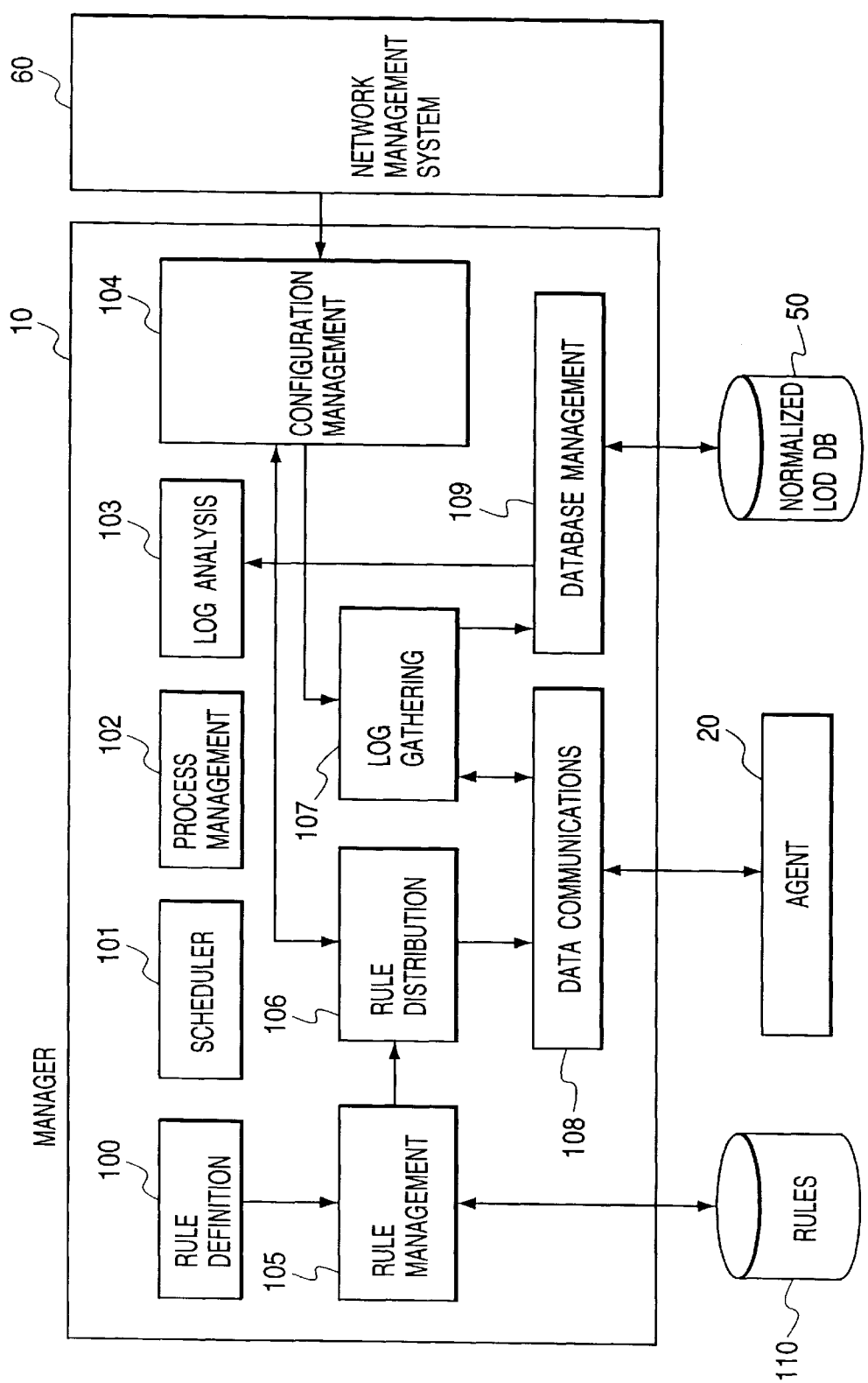
FIG. 3 is a functional block diagram depicting a configuration of the manager 10 employed in the embodiment shown in FIG. 1.

FIG. 3 is a functional block diagram showing the structure of the manager 10. Rules 110 are defined various rules and stored in a storage device. The normalized log database 50 is a database for storing the gathered normalized log data therein, which in turn is stored in the storage device. The network management system 60 is a system which comprises other computers connected to the computer for storing the manager 10 through a network and a terminal for monitoring the network. A network management system run by the same computer as the manager 10 manages operation states (such as in-connection/disconnection, in-operation/deactivate states) of respective communication lines, routers, repeaters, various computers, and computer programs or the like, all of which are components of the network, locations of the respective network components, etc. A summary of the functions of respective functional modules, which constitute the manager 10, will be explained below.

(1) Rule definition 100:

The rule definition 100 is a program tool for defining various rules by an administrator, which in turn provides such a GUI (Graphical User Interface) that a user is able to easily set rules through the use of input device and display device unillustrated in the drawing.

(2) Scheduler 101:

The scheduler 101 is a program for notifying opportunities for executing a rule distribution and a log gathering to a rule distribution 106 and a log gathering 107 respectively. As examples of the opportunities, an execution start is specified or designated as in the case of at 5 p.m. every day, at 3:15 p.m. on every Saturday, etc.

(3) Process management 102:

The process management 102 is a program for controlling start-up/halt of the individual functional modules of the manager 10, which are designated at numerals 100 through 109.

(4) Log analysis 103:

The log analysis 103 is a program for extracting a group of normalized log data from the normalized log database 50 through the database management 109 and effecting a predetermined analysis on the extracted group. An example of a log data analysis at the time that a log event is a login, is shown in Table 1 below.

TABLE 1

An example of log data analysis

| Log analysis items | Normalized items to be used |
| --- | --- |
| Tried login from out of a predetermined login area and resulted in success. | User name Source host name Source IP address |
| Tried login in out of a predetermined time period and failed. | User name Start time |
| The same user made login simultaneously from different areas. | User name Source host name |
| Tried logins more times than a predetermined ones during a certain period and resulted in failures. | Log event Result of log event User name Corrected times |
| Tried user alterations where the user failed in a combination of user name and password more than a predetermined times. | Log event Result of log event User name User name after alteration Corrected times |

(5) Configuration Management 104:

The configuration management 104 is a program for managing a list of agents 20. The configuration management 104 inquires of the network management system 60 to obtain the availabilities of computers in which the agents 20 operate, and information about their ping response times or the like. Thereafter, the configuration management 104 transfers the obtained ones to the rule distribution 106 or the log gathering 107.

(6) Rule management 105:

The rule management 105 receives the defined various rules from the rule definition 100 and allows the rules 110 to store them. Further, the rule management 105 reads the rules from the rules 110 and transfers same to the rule distribution 106.

(7) Rule distribution 106:

The rule distribution 106 is a program for acquiring the various rules from the rule management 105 in accordance with instructions issued from the scheduler 101 and transferring them to the agents 20.

(8) Log gathering 107:

The log gathering 107 is a program for collecting normalized log files from the agents 20 in accordance with the instructions issued from the scheduler 101.

(9) Data communications 108:

The data communications 108 are a program for controlling communications between either of the rule distribution 106 and the log gathering 107 and their corresponding agents 20 when they communicate with the agents 20.

(10) Database management 109:

The database management 109 causes the normalized log database 50 to store the group of normalized log data (normalized log files) collected from the agents 20 by the log gathering 107 and retrieves and extracts the normalized log data in response to a request issued from the log analysis 103. Further, the database management 109 deletes the normalized log data past a predetermined preservation period from the normalized log database 50 to thereby create an unused storage area.

Figure 4:
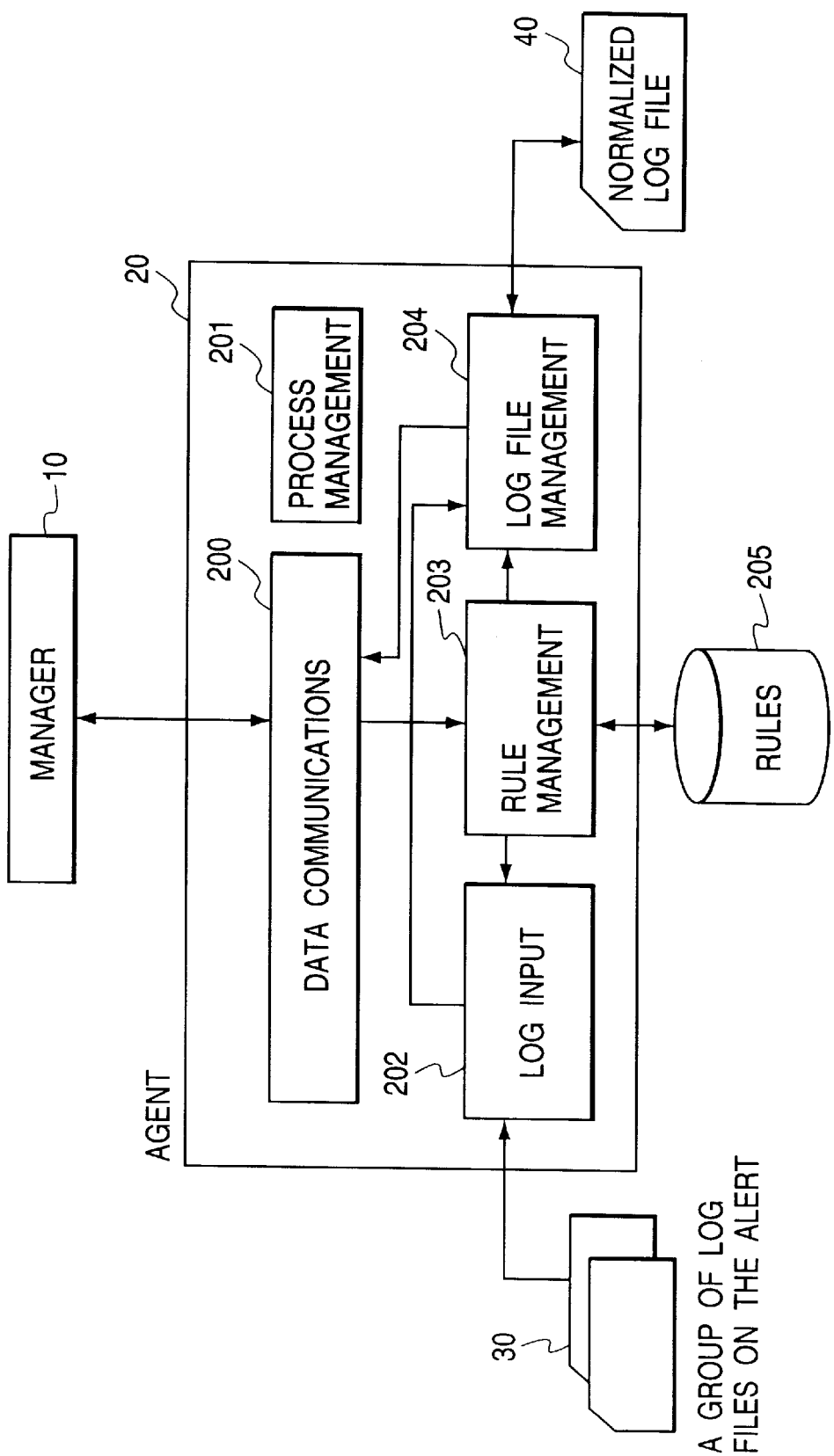
FIG. 4 is a functional block diagram showing a configuration of the agent 20 employed in the embodiment shown in FIG. 1.

FIG. 4 is a functional block diagram showing the configuration of the agent 20. Rules 205 are distributed various rules and are stored in a storage device. A group of log files on the alert 30 correspond to log files to be alerted and is stored in a storage device. A normalized log file 40 is a file for storing normalized log data therein and is stored in a storage device. A summary of the functions of individual functional modules constituting each agent 20 will be described below.

(1) Data communications 200:

The data communications 200 are a program for controlling communications between either of a rule management 203 and a log file management 204 and their corresponding manager 10 when they communicate with the manager 10.

(2) Process management 201:

The process management 201 is a program for controlling start-up/halt of individual functional modules designated at numerals 200 through 204 of the agent 20.

(3) Log input 202:

The log input 202 is a program for obtaining rules on log files on the alert, a format rule, etc. from the rule management 203, normalizing log data inputted from the group of log files on the alert 30 and thereafter transferring the normalized log data to the log file management 204.

(4) Rule management 203:

The rule management 203 is a program for storing various rules distributed from the manager 10 in a storage device thereof as the rules 205 and offering or providing the rules according to a request issued from the log input 202 or the log file management 204.

(5) Log file management 204:

The log file management 204 acquires a filtering rule from the rule management 203, filters the normalized log data received from the log input 202, adds corrected times thereto and allows the normalized log file 40 to store the data therein. The log file management 204 transfers the normalized log file 40 to the manager 10 when it has received a gathering request of the normalized log file 40 from the log gathering 107 of the manager 10.

FIGS. 5 through 14 respectively show examples of structures of normalized log data.

Figure 5:
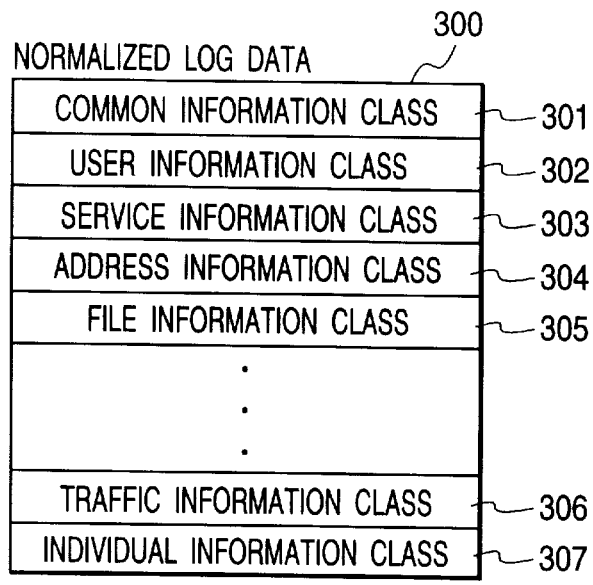
FIG. 5 is a diagram schematically illustrating a structure of normalized log data employed in the embodiment shown in FIG. 1.

FIG. 5 is a diagram showing a schematic structure of normalized log data 300 stored in the normalized log file 40. The normalized log data 300 comprises a common information class 301, and a user information class 302, a service information class 303, an address information class 304, a file information class 305, a traffic information class 306, an individual information class 307, etc., all of which are added thereto as needed. The common information class 301 is an information class essential to all the normalized log data 300. The remaining information classes are selected according to the outputted log data.

Figure 6:
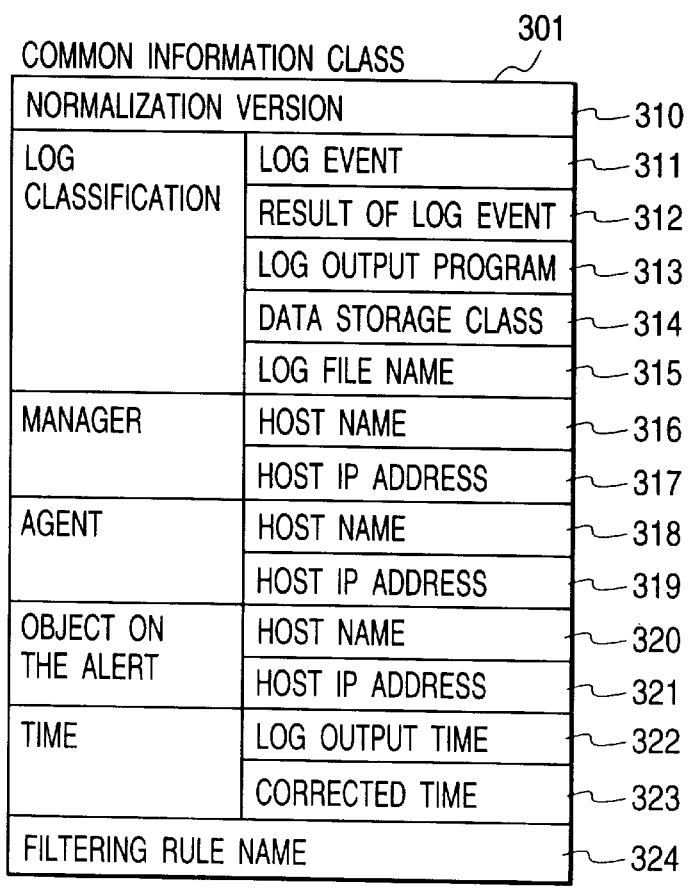
FIG. 6 is a diagram depicting a data structure of a common information class employed in the embodiment shown in FIG. 1.

FIG. 6 is a diagram showing a data structure of the common information class 301. A normalization version 310 is a number indicative of the version of normalization. A log classification includes a log event 311, a result of log event 312, a log output program 313, a data storage class 314 and a log file name 315. The log output program 313 indicates the name of OS or AP that has put out logs. The log file name 315 indicates the name of a log file outputted by the log output program 313. A manager stores therein a host name 316 and a host IP address 317 of a computer installing the manager. An agent stores therein a host name 318 and a host IP address 319 of a computer installing the agent which inputted logs. An object on the alert stores therein a host name 320 and a host IP address 321 of a computer such as a server or the like to be placed on the alert. A time comprises a log output time 322 and a corrected time 323. The log output time 322 corresponds to a local time of a computer from which a log is outputted. The corrected time 323 corresponds to a time corrected based on the time of the computer installing the manager 10. A filtering rule name 324 indicates the name of a filtering rule applied when log data is normalized.

Figure 7:
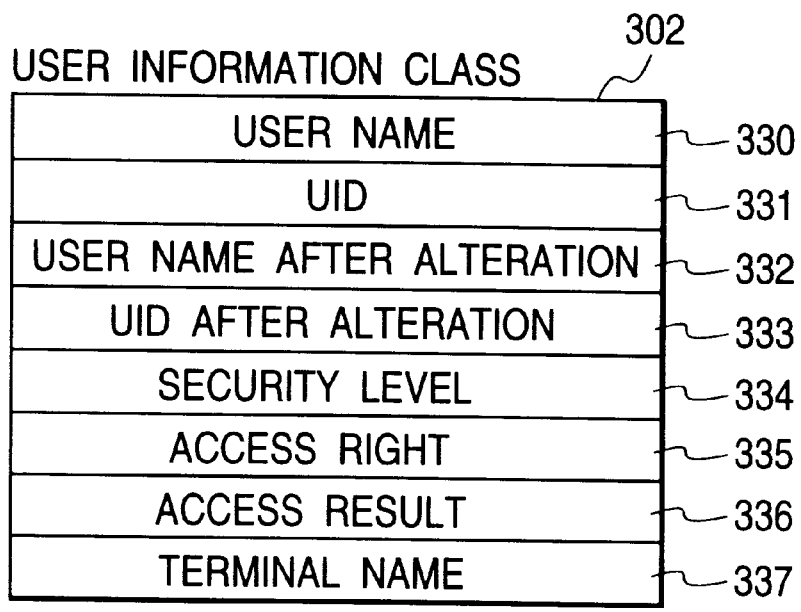
FIG. 7 is a diagram showing a data structure of a user information class employed in the embodiment shown in FIG. 1.

FIG. 7 is a diagram showing a data structure of the user information class 302. The user information class 302 is equivalent to one for recording information about a logged-in user and stores therein a user name 330, a user ID (UID) 331, a user name 332 after user's alteration, a UID after alteration 333, a user's security level 334, an access right 335 to computers or files, an access result 336 and a name of a terminal device (terminal name 337) operated by a user.

Figure 8:
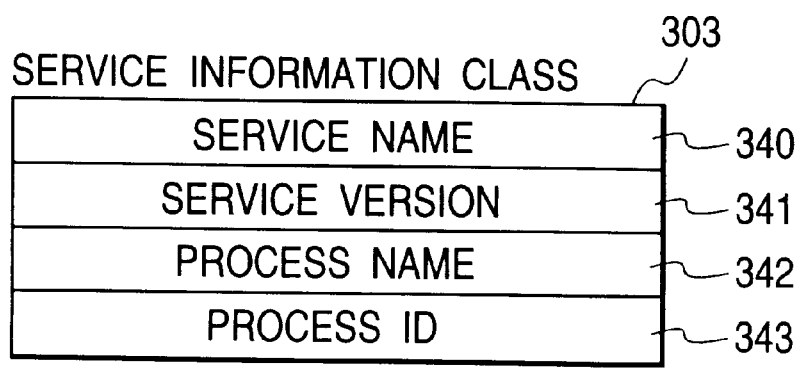
FIG. 8 is a diagram illustrating a data structure of a service information class employed in the embodiment shown in FIG. 1.

FIG. 8 is a diagram showing a data structure of the service information class 303. The service information class 303 records information about services made available to a user. The service information class 303 stores a service name 340, a service version 341, a name of a process (process name 342) started up for providing services, and a process ID 343.

Figure 9:
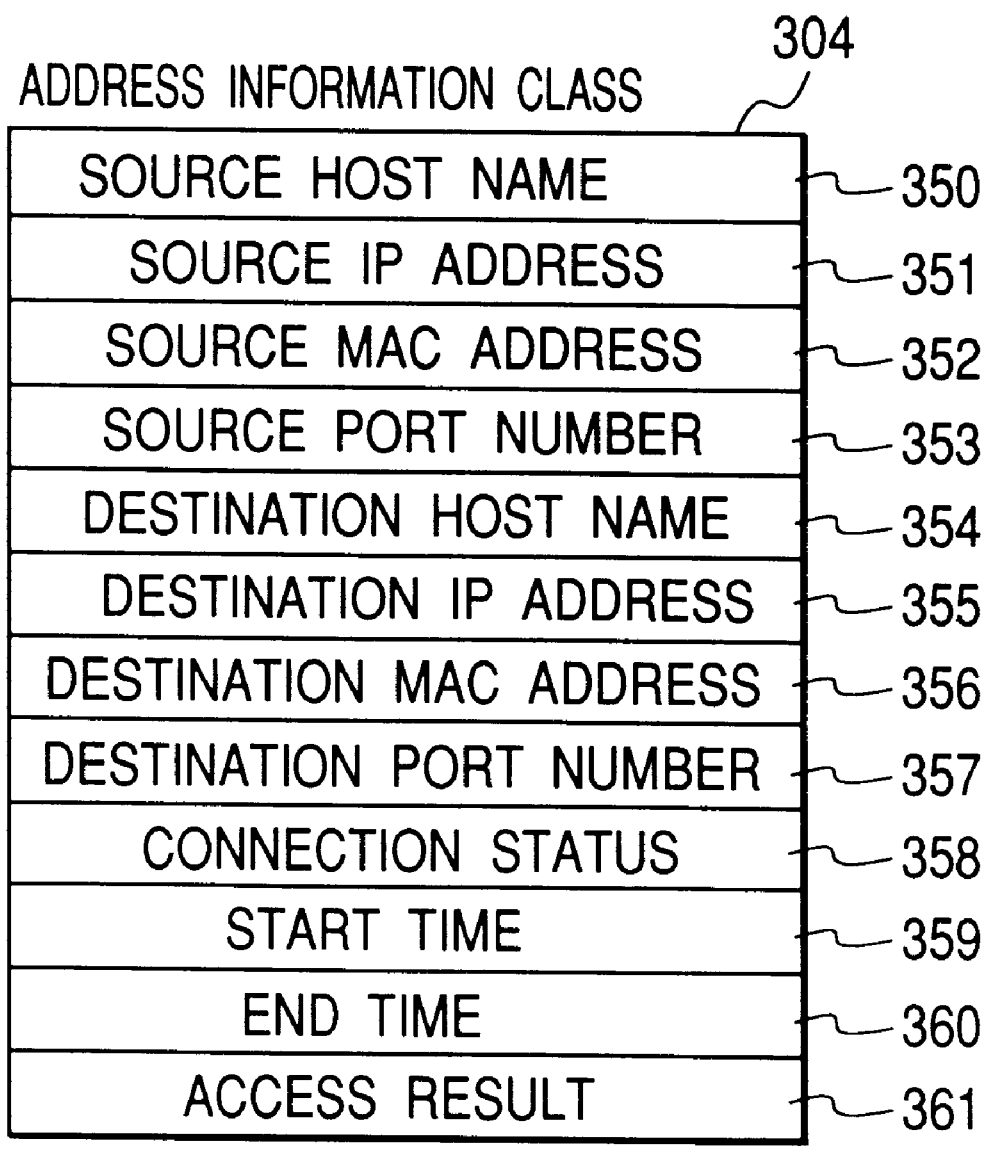
FIG. 9 is a diagram depicting a data structure of an address information class employed in the embodiment shown in FIG. 1.

FIG. 9 is a diagram illustrating a data structure of the address information class 304. The address information class 304 corresponds to one for recording the information upon executing a connection to other computers and stores therein a connection status, connection start and end times and the result of access to other computers as well as a source host name, a source IP address, a source MAC address and a source port number and a destination host name, a destination IP address, a destination MAC address and a destination port number.

FIG. 10 is a diagram showing a data structure of the file information class 305. The file information class 305 records a file name, access information before alteration and access information after alteration for a file created or altered by a user. The access information consists of a file creation time, a final modification time, a final access time, a file i-node number, the presence or absence of access permission, UID, a group ID (GID), and a final file size.

FIG. 11 is a diagram showing a data structure of the traffic information class 306. The traffic information class 306 is a log information outputted from a mail management program, a file transfer program or the like and records the number of receiving bytes of data or messages through a network, the number of sending bytes thereof, and the time required to transfer data (processing time).

FIG. 12 is a diagram showing a data structure of the individual information class 307. The individual information class 307 is optional and corresponds to information left intact as the original of a message text outputted by a program.

FIG. 13 is a diagram showing a data structure of the data storage class 314. "T1" indicates a tag for identifying the data storage class 314. "L1" indicates the length of a region or area V1 for specifying existent information classes. "V1" is the area for specifying an information class included in each normalized log data 300 and specifies a tag indicative of the start of the specification of the information class, the length of an information class identifier, and an information class identifier in order. The information class identifier can be of a variable length. Assuming a number for identifying each information class as x, Tx ($x \geq 2$) indicates a tag indicative of the start of each information class. Lx ($x \geq 2$) indicates the length of a Vx portion thereof and Vx ($x \geq 2$) indicates an information class identifier. The manager 10 recognizes the information classes included in each normalized log data from the data storage class 314.

FIG. 14 is a diagram showing one example of a code table 600 including codable ones of normalized items. When a log event 311 of the normalized items indicates "login", it is coded into a code "1". When the log event 311 of the normalized items indicates alteration by users "su", it is coded into a code "2". A connect indicates a log event about a connection at the time that a file transfer or program-to-program communications are made between computers. A file indicates a log event about a file whose contents are altered. A job indicates a log event about start-up/halt/end states of a job. A mail indicates a log event about the use of a mail. The result of log event 312 corresponds to the result of a log event and makes a distinction between the success and failure. The access right 335 of the user information class 302 makes a distinction as to "possessed" or "not possessed". For Each of access results of the user information class 302 and the address information class 304, the success or failure is classified. For Access permission of the file information class 305, "possessed" or "not possessed" is classified.

FIGS. 15 through 20 respectively show data formats of rules.

FIG. 15 is a diagram showing one example of a manager rule 450. DB_MAX 451 defines a period in which the normalized log database 50 can preserve normalized log data. RULE_MAX 452 defines the maximum number of channels available to rule distribution. LOG_MAX 453 defines the maximum number of channels available to log gathering. The rule distribution 106 and the log gathering 107 can use channels by the multiplexing factors. When number of processing requests exceeds the multiplexing factor, the channels are used in turn. The remaining requests await processing until the channels become available.

FIG. 16 is a diagram showing one example of a rule on operation conditions 470 of an agent 20. MANAGER_ADDRESS 471 defines an IP address of a manager. FILE_MAXSIZE 472 defines the maximum storage capacity available for the normalized log file 40.

FIG. 17 is a diagram illustrating one example of rules on log files on the alert 500. TARGET_LOG defines the name of log files on the alert. FORMAT defines file formats (SEQ: sequential format, WRAP: wrap around format). INTERVAL defines a time interval (e.g., an interval of 10 minutes) corresponding to a monitoring interval. FMT_NAME defines a rule applied when the corresponding log file is normalized. A description will be made of the rules on log files on the alert 500 by way of example.

TARGET_LOG:/usr/adm/syslog.log, FORMAT=SEQ, INTERVAL=10 m, FMT_NAME=abc;

indicates that a file/usr/adm/syslog.log of a sequential format is monitored at 10-minute intervals and normalization processing is executed in accordance with a format rule abc. When no FMT_NAME is specified, normalization is done in accordance with a format rule common among agents 20.

FIGS. 18 and 19 are respectively diagrams showing examples of format rules 510 and 515. When log data is represented in text form, FMT_T is applied thereto. When the log data is represented in binary form, FMT_B is applied thereto. REGTEXT="character string n" indicates a condition for selecting log data. If the character string n exists in the log data, then REGTEXT indicates the normalization of log data in accordance with the following rules. && indicates a logical product (AND) and can define the presence of a plurality of character strings as selection conditions. | indicates "then" and means that normalized items are picked up or gathered in order from the character string in accordance with the sequence of character strings of log data subsequently. The normalized items correspond to data items defined by the respective information classes. : indicates a delimitation character for displacing or shifting a pointer in order from the beginning of log data and cutting out values corresponding to normalized items. Each character specified within [ ] following the normalized items specifies the length of a character string recognized from an arbitrary pointer or designates the final character recognized when the character string is of a variable length. SKIP means that if a character string regardless of the normalized items exists when the pointer is displaced in order from the beginning of log data, then the character string is skipped, and specifies the number of characters skipped or a "delimitation character" defined as the final character to be recognized, within [ ]. When the delimitation character is specified, the whole character string up to the delimitation character is skipped. The examples of the format rules will be explained below.

(a) Format rule A:

FMT_T:REGTEXT=="SU" &®TEXT=="+" | log event=="2" | result of log event=="0" :SKIP[" "]: log output time [10]: SKIP[3]:terminal name[" "]:user name["—"]:user name after alteration[" "];

(b) Format rule B:

FMT_T:REGTEXT =="connect" &®TEXT== "refused" | log event=="3" | result of log event=="1" :log output time[15]: destination host name[" "]:process name[" "]:process ID["]"]:SKIP["from"]:source host name[" "];

FIG. 21 is a diagram showing examples of the originals of message texts stored in a log file. Message texts 551 and 552 indicate examples of message texts about alteration by user, which are outputted from the OS. Message texts 553 through 555 are message texts upon connection outputted by the OS. Message texts 556 and 557 are message texts outputted from a job management of the OS.

When the message text 551 is normalized in accordance with the format rule A:

log event 311=2 (su)

result of log event 312=0 (success)

log output time 322=epoch time of ⅓₀ 11:18 terminal name 337=ttyp5 user name 330=fujino, and user name after alteration 332=root.

When the message text 554 is normalized in accordance with the format rule B:

log event 311=3 (connect)

result of log event 312=1 (failure)

log output time 322=epoch time of Jan 12 13:12:15 destination host name 354=hosta destination IP address 355=value obtained by converting hosta to IP address process name 342=ftpd process ID 343=1111

Source host name 350=hostb, and

Source IP address 351=value obtained by converting hostb to IP address.

FIG. 20 is a diagram showing one example of the filtering rule 520. The filtering rule 520 is a rule which allows the log file management 204 to store only the suitable normalized log data. FLT indicates a filtering rule. When a normalized item is a specified character string or code, or normalized log data in a specified time zone, The rule causes extracting and storing of only normalized log data fit to such a condition. ==means equal, !=means not equal, && means a logical product AND, || means a logical sum OR, -means a time interval respectively.

Figure 22:
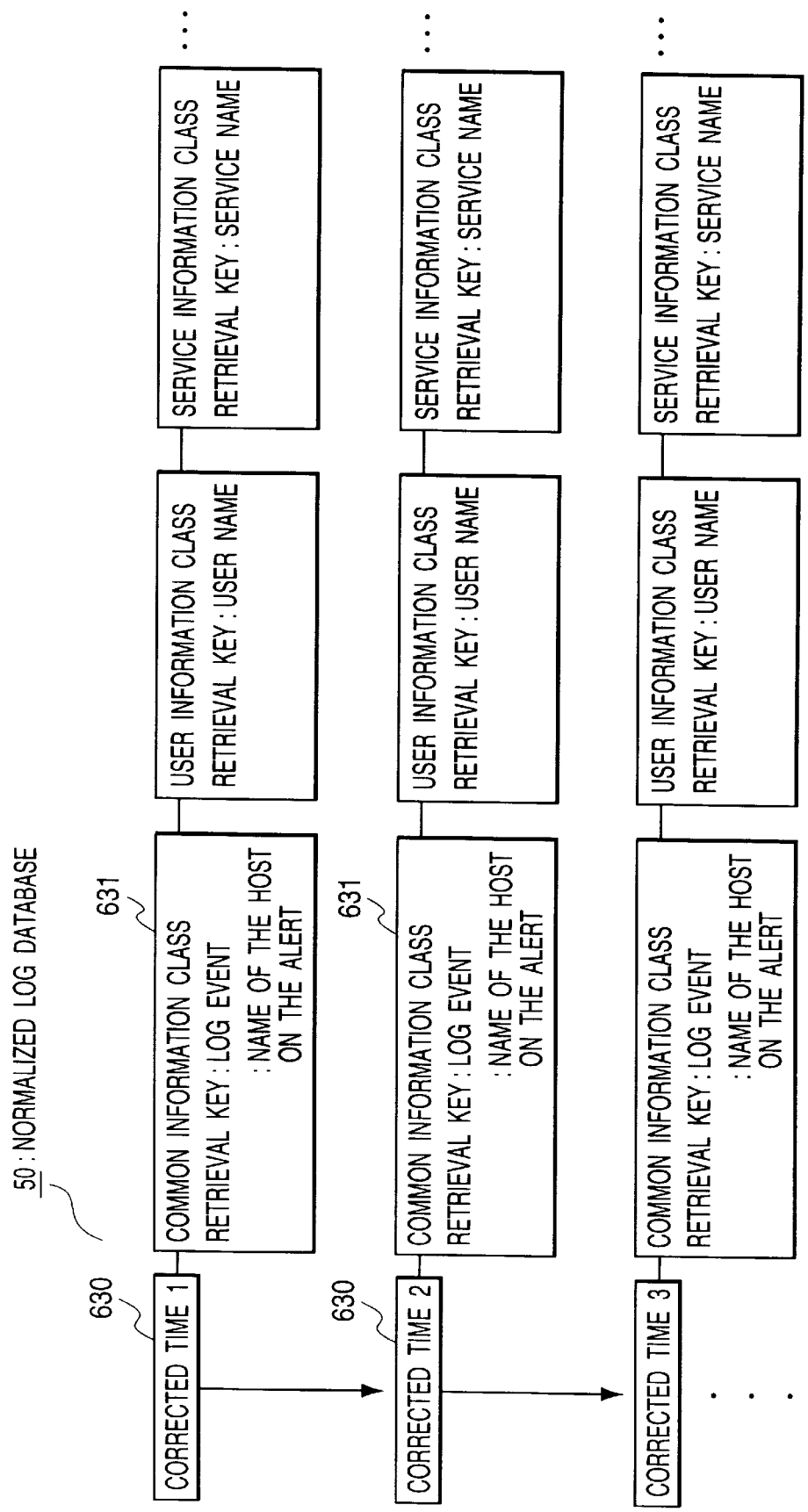
FIG. 22 is a diagram showing a data structure of a normalized log database employed in the embodiment shown in FIG. 1.

FIG. 22 is a diagram showing a data structure of the normalized log database 50 as an illustrative example. The normalized log database 50 arranges normalized log data in order of corrected times 630 and stores the same therein. A log data belonging to a common information class 631 is chained to a given corrected time 630. Further, the corresponding log data of existent information classes are chained one after another following the log data of common information class 631. A retrieval key designated in correspondence with each information class specifies a normalized item used as a key when the normalized log data is searched. A chain extends from a corrected time 630 to the next corrected time 630. A user is able to specify the corrected time 630 or specify the retrieval key of the suitable information class to thereby efficiently extract the intended normalized log data from the normalized log database 50.

Figure 23:
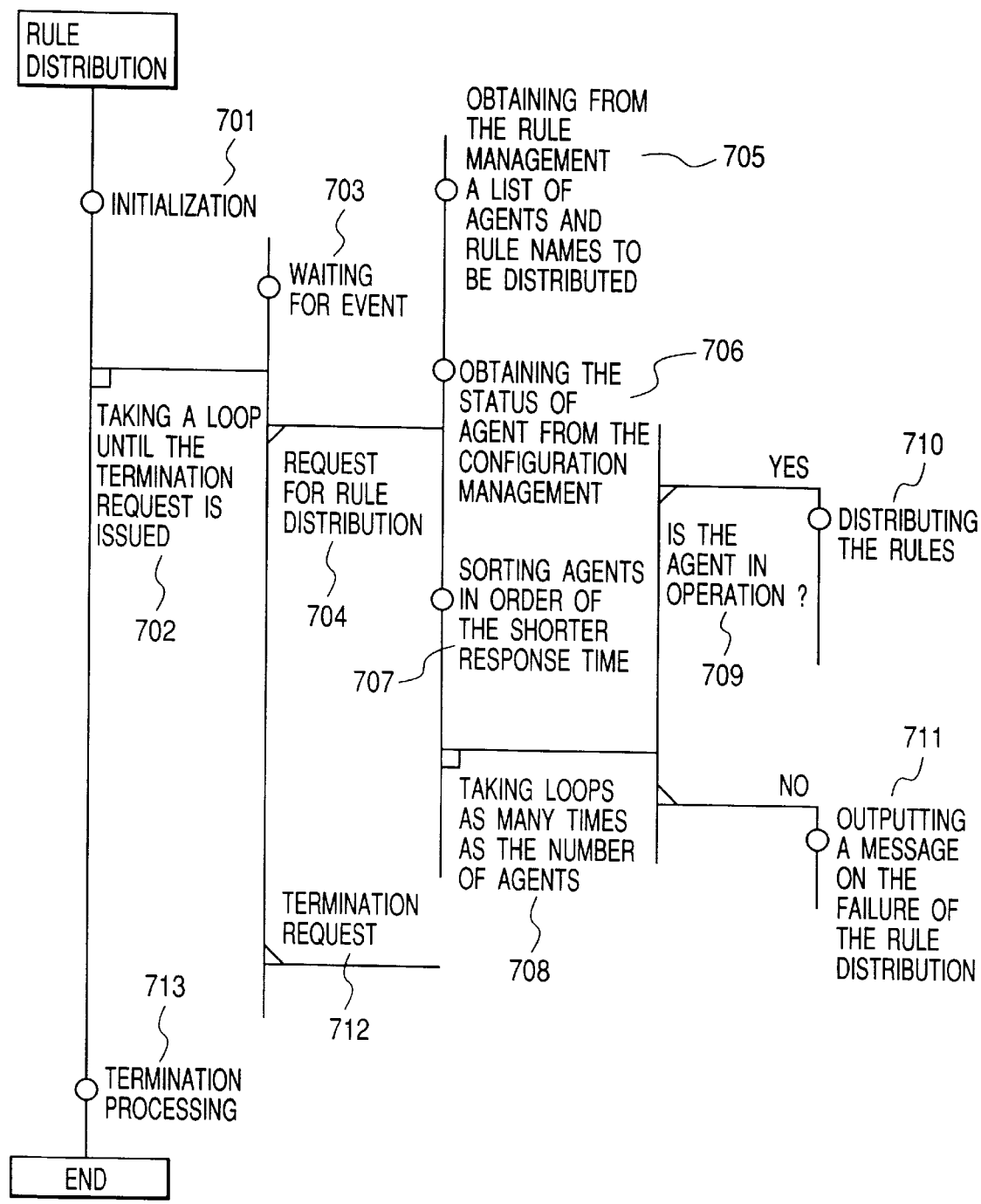
FIG. 23 is a PAD diagram illustrating the flow of processing of a rule distribution, which is performed by the manager employed in the embodiment shown in FIG. 1.

FIG. 23 is a PAD diagram showing the flow of processing of the rule distribution 106 of the manager 10. The rule distribution 106 performs its initialization (Step 701) and takes a loop until a termination request is issued from the process management 102 (Step 702), to wait for events (Step 703). The events include a request for rule distribution issued from the scheduler 101 (Step 704) and a termination request issued from the process management 102 (Step 712).

When the rule distribution 106 has received the rule distribution request (Step 704), it obtains rules to be distributed and a list of destination agents 20 (Step 705) through the rule management 105 and acquires information about operation status and response times of the agents 20 from the configuration management 104 (Step 706). The rule distribution 106 re-arranges the obtained ping response times of the agents 20 in order of the shorter response time (Step 707). With respect to agents 20 not in operation at this time, the rule distribution 106 assumes their response times as infinity. The rule distribution 106 takes loops as many as the number of the agents 20 to distribute the rules (Step 708). When the agent 20 is in operation (if the answer is found to be YES in Step 709), the rule distribution 106 distributes the rules in order of the shorter response time (Step 710). On the other hand, when the agent 20 is not in operation, the rule distribution 106 outputs a message on the failure of the rule distribution thereto (Step 711). RULE_MAX 452 is applied to allow the rule distribution 106 to distribute the rules. The distributed rules are transferred to the rule management 203 of each agent 20.

When the termination request is received by the rule distribution 106, the rule distribution 106 gets out of the loop and performs termination processing (Step 713).

Figure 24:
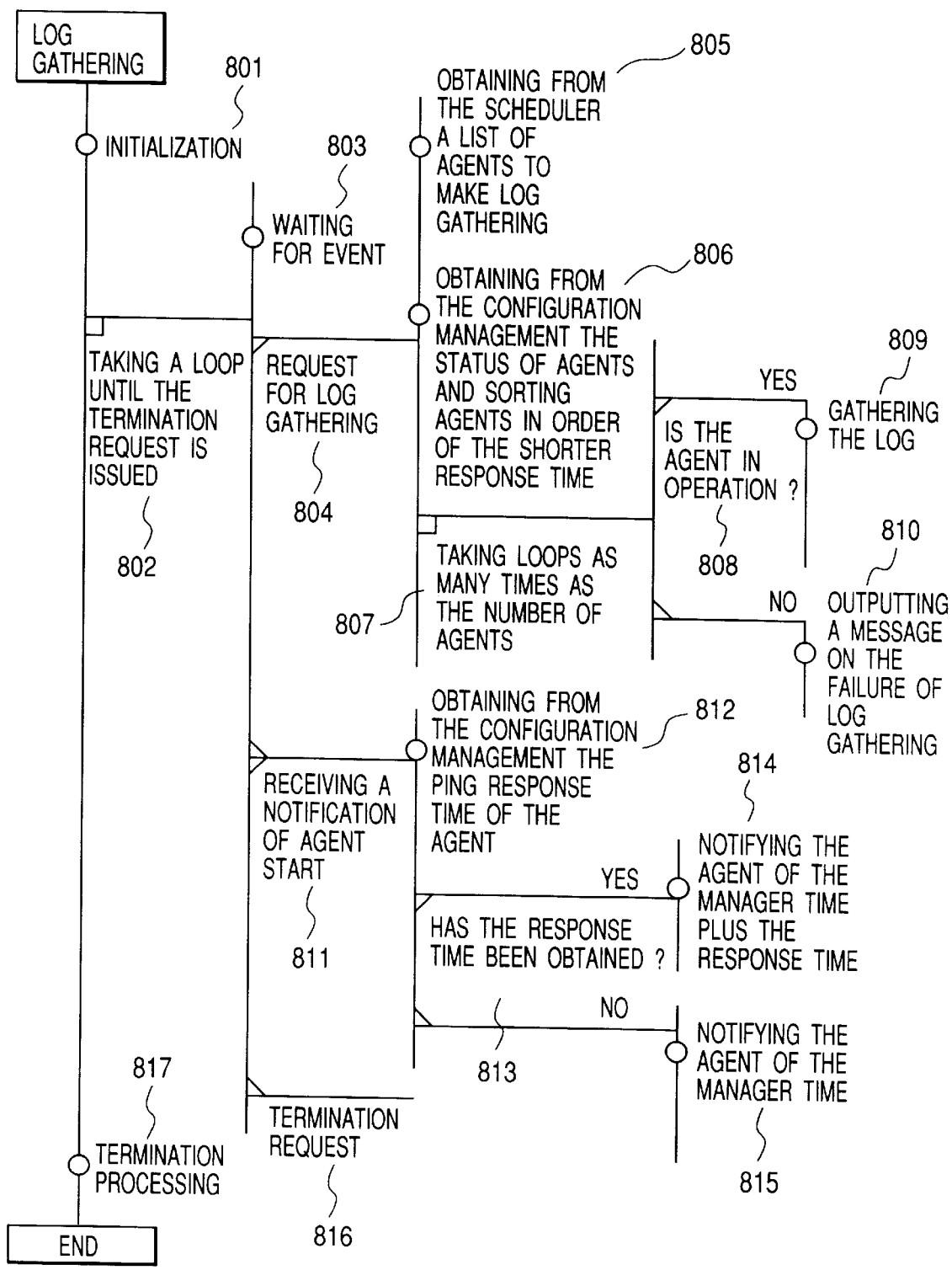
FIG. 24 is a PAD diagram depicting the flow of processing of a log gathering, which is performed by the manager employed in the embodiment shown in FIG. 1.

FIG. 24 is a PAD diagram showing the flow of processing of the log gathering 107 of the manager 10. The log gathering 107 performs its initialization (Step 801) and takes a loop until the termination request is issued from the process management 102 (Step 802), to wait for events (Step 803). The events include a request for log gathering issued from the scheduler 101 (Step 804), a notification of agent start issued from each agent 20 (Step 811) and a termination request issued from the process management 102 (step 816).

When the log gathering 107 has received the request for log gathering (Step 804), it obtains from the scheduler 101 a list of agents 20 to make log gathering (Step 805). Further, the log gathering 107 obtains information about the operation status and response times of these agents 20 from the configuration management 104 and sorts the agents 20 in order of the shorter response time (Step 806). The log gathering 107 takes loops as many as the number of the agents 20 to make log gathering (Step 807). When the agent is in operation (if the answer is found to be YES in Step 808), the log gathering 107 gathers the log (Step 809). When the agent is not in operation (if the answer is found to be NO in Step 808), the log gathering 107 outputs a message on the failure of log gathering (Step 810). LOG_MAX 453 is applied to allow the log gathering 107 to gather the log. The log gathering 107 gathers the normalized log file 40 through the log file management 204 of each agent 20.

When the log gathering 107 has received the notification of agent start (Step 811), it obtains the ping (ICMP echo request) response time of the agent 20 from the configuration management 104 (Step 812). ICMP (Internet Control Message Protocol) indicates a management standard of IAB (Internet Activities Board) corresponding to one international standard specification about the management of communication network. When ICMP is used, the log gathering 107 is capable of confirming whether an IP node (e.g., a computer) is able to communicate with other IP nodes. When the ping is used, the log gathering 107 can obtain the operation status of whether the IP node is able to communicate with arbitrary IP nodes and response time of the IP node. When the log gathering 107 has obtained the ping response time (if the answer is found to be YES in Step 813), it notifies a time obtained by adding a communication time obtained from the response time to the present time of the manager 10 to the corresponding agent 20 that has issued the notification of agent start (Step 814). In order to cause the log gathering 107 to notify the manager time to the agent, the manager time plus the communication time may be notified from the manager to the agent. The ping response time corresponds to a time interval which amounts to the communication time from manager to agent added to the communication time from agent to manager, i.e., a go-and-return communication time. Therefore, one half the ping response time is used as the communication time. Namely, the manager estimates the agent time from the following equation and notifies it to the agent.

$$(\text{Agent time}) \approx (\text{manager time}) + (\text{ping response time})/2$$

When the log gathering 107 cannot obtain the response time (if the answer is found to be NO in Step 813), i.e., when no information is obtained from the network management system 60, the log gathering 107 simply notifies the present time of the manager 10 to the agent 20 (Step 815). The agent 20 obtains the present time of the manager 10 and applies it to the corrected time 323 of the normalized log data.

When the log gathering 107 has received the termination request (Step 816), it gets out of the loop and executes termination processing (Step 817).

Figure 25:
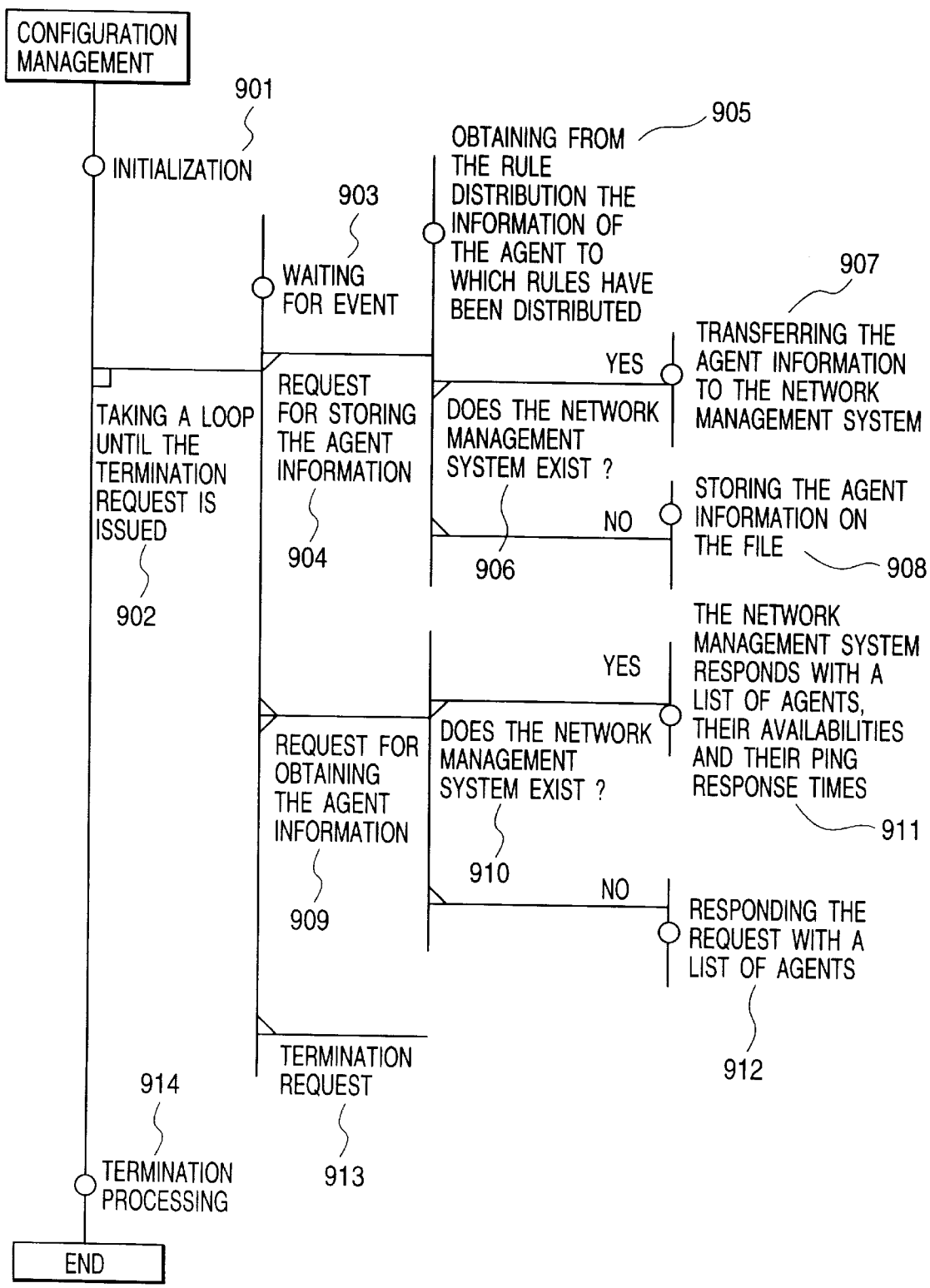
FIG. 25 is a PAD diagram showing the flow of processing of a configuration management, which is performed by the manager employed in the embodiment shown in FIG. 1.

FIG. 25 is a PAD diagram showing the flow of processing of the configuration management 104 of the manager 10. The configuration management 104 is initialized (Step 901), thereafter takes a loop until a termination request is issued from the process management 102 (Step 902), and waits for events (Step 903). The events include a request for storing the agent information, which is issued from the rule distribution 106 (Step 904), a request for obtaining the agent information, which is issued from the rule distribution 106 or the log gathering 107 (Step 909) and the termination request issued from the process management 102 (Step 913).

When the configuration management 104 has received the request for storing the agent information (Step 904), the configuration management 104 obtains the information of the agent 20 to which rules have been distributed, from the rule distribution 106 (Step 905). The information of the agent 20 includes the time for distribution of rules, the name of rules distributed, etc. When the configuration management 104 is able to communicate with the network management system 60 (if the answer is found to be YES in Step 906), it transfers the obtained agent information to the network management system 60 (Step 907). The network management system 60 can make use of the received information about the history of the rule distribution for network management. When the configuration management 104 is not able to communicate with the network management system 60 (if the answer is found to be NO in Step 906), the agent information is stored on the file the configuration management 104 holds (Step 908).

When the configuration management 104 has received the request for obtaining the agent information (Step 909), the configuration management 104 obtains a list of agents 20, their availabilities and their ping response times or the like from the network management system 60 and responds the request with these information (Step 911) if the configuration management 104 is able to communicate with the network management system 60 (if the answer is found to be YES in Step 910). When the configuration management 104 is not able to communicate with the network management system 60 (if the answer is found to be NO in Step 910), the configuration management 104 obtains information about a list of agents from the file of the configuration management 104 and responds the request with it (Step 912).

When the configuration management 104 has received the termination request (Step 913), it gets out of the loop and performs termination processing (Step 914).

Figure 26:
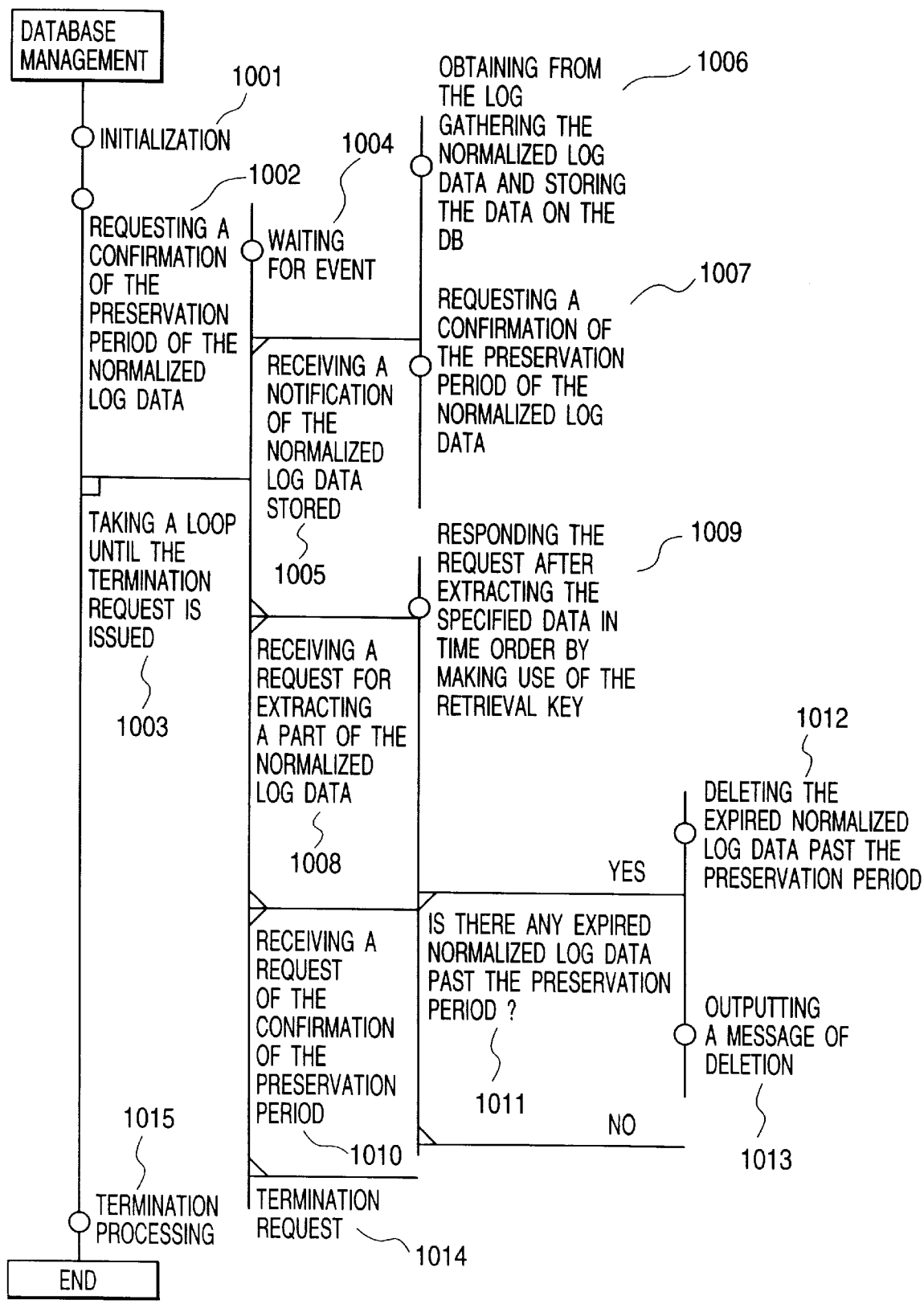
FIG. 26 is a PAD diagram illustrating the flow of processing of a database management, which is performed by the manager employed in the embodiment shown in FIG. 1.

FIG. 26 is a PAD diagram showing the flow of the database management 109 of the manager 10. The database management 109 is initialized (Step 1001) and requests a confirmation of the preservation period of the normalized log data stored in the normalized log database 50 (Step 1002). Thereafter, the database management 109 takes a loop until the termination request is issued from the process management 102 (Step 1003) and waits for events (Step 1004). The events include a notification of storing of the normalized log data issued from the log gathering 107 (Step 1005), a request for extracting a part of the normalized log data from the log analysis 103 (Step 1008), a request for the confirmation of the preservation period of the normalized log data by the database management 109 itself (Step 1010), and a termination request issued from the process management 102 (Step 1014).

When the database management 109 has received the notification of storing of the normalized log data (Step 1005), it obtains the normalized log data from the log gathering 107 and causes the normalized log database 50 to store the log data therein (Step 1006). When the database management 109 stores the log data in the normalized log database 50, the storing of the normalized log data is performed in accordance with the data structure shown in FIG. 22. Since the normalized log data are arranged in order of the corrected times 630, the database management 109 merges the normalized log data in accordance with this order. The database management 109 requests a confirmation of the preservation period of the normalized log data (Step 1007).

When the database management 109 has received the request for extracting the part of the normalized log data (Step 1008), it searches the normalized log database 50 by the specified retrieval key and consequently responds the request with the extracted data (Step 1009).

When the database management 109 has received the request for the confirmation of the preservation period (Step 1010), it compares the difference between the oldest corrected time 630 of the normalized log data stored in the normalized log database 50 and the present time with DB_MAX 451 (Step 1011). When the expired normalized log data past the preservation period is stored in the normalized log database 50, the database management 109 deletes the expired normalized log data (Step 1012) and outputs a message of deletion to notify it to the administrator (Step 1013).

When the database management 109 has received the termination request (Step 1014), it gets out of the loop and performs termination processing (Step 1015).

Figure 27:
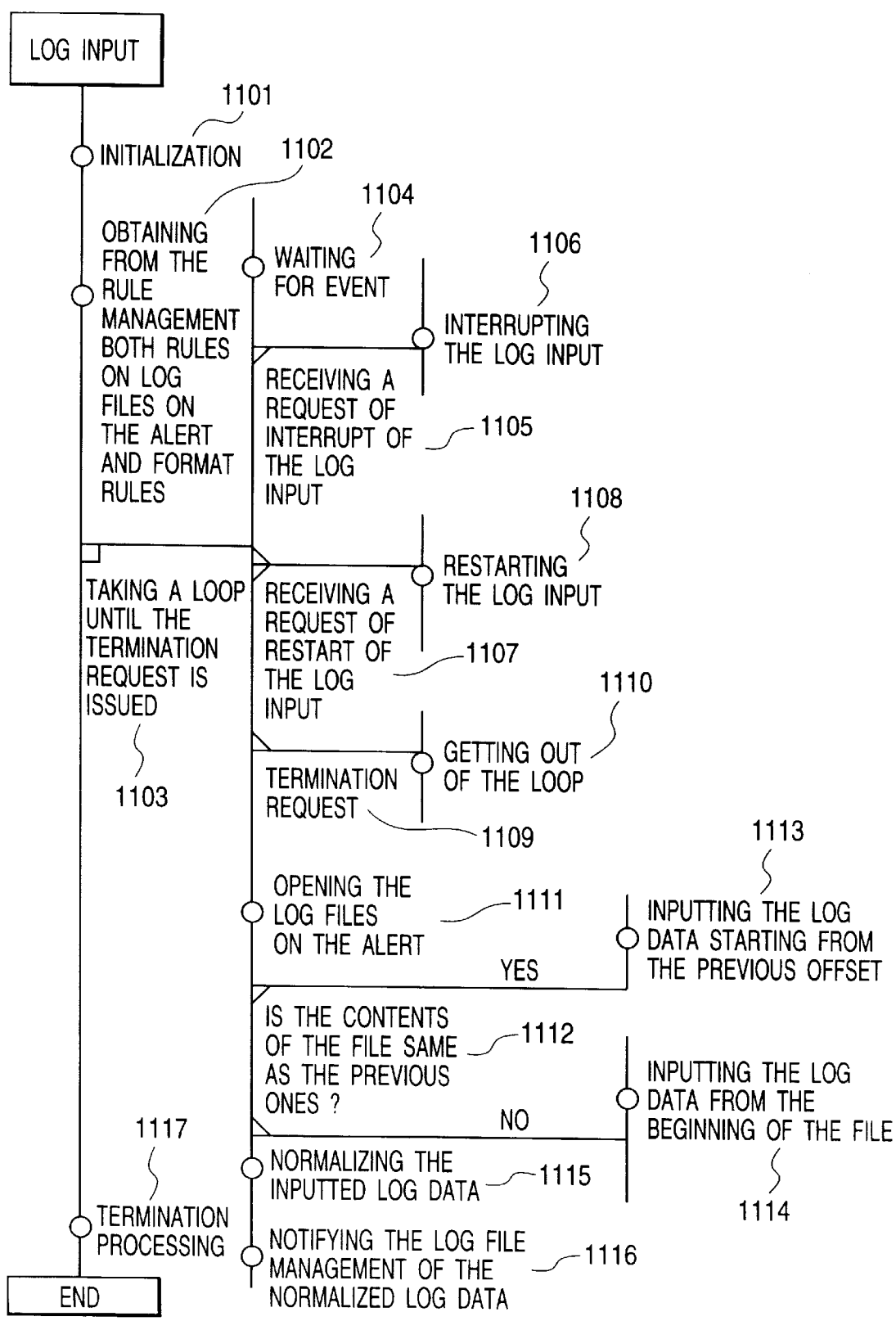
FIG. 27 is a PAD diagram depicting the flow of processing of a log input which is performed by the agent employed in the embodiment shown in FIG. 1.

FIG. 27 is a PAD diagram showing the flow of processing of the log input 202 of the agent 20. The log input 202 performs its initialization (Step 1101) and obtains the rules on log files on the alert 500 and the format rules 510 and 515, etc. from the rule management 203 of the agent 20 (Step 1102). Thereafter, the log input 202 takes a loop until the termination request is issued from the process management 201 (Step 1103) and waits for events (Step 1104). The events include a request of interrupt of the log input (Step 1105) and a request of restart of the log input from the log file management 204 (Step 1107), a termination request issued from the process management 201 (Step 1109), and a timer interrupt based on the monitoring of a time interval.

When the log input 202 has received the request of interrupt of the log input (Step 1105), it interrupts the log input (Step 1106). A factor to interrupt the log input is the time when the capacity of the normalized log file 40 has reached FILE_MAXSIZE 472.

When the log input 202 has received the request of restart of the log input (Step 1107), it restarts the log input (Step 1108). A factor to restart the log input is the time when the normalized log file has been transferred to the manager 10.

When the log input 202 has received the termination request (Step 1109), it gets out of the loop and performs termination processing (Step 1117).

When a monitoring time of log files is reached in accordance with the monitoring interval set in the rules on log files on the alert 500, the log input 202 opens the group of log files on the alert 30 (Step 1111) and obtains file management information of the log files. The log input 202 confirms whether the file management information is identical to one obtained previously (Step 1112). When they are identical to each other (if the answer is found to be YES in Step 1112), the contents of the file are same as the ones of the previously-opened file. Therefore, the log input 202 inputs the log data starting from the previous offset of the file (Step 1113). The previous offset of the file indicates a record next to the previously-inputted records with respect to the file. When the file management information is different from the previously-obtained one (if the answer is found to be NO in Step 1112), the log input 202 regards it as a new file (e.g., the previously-opened file has been deleted) and inputs the log data from the beginning of the file (Step 1114). Thereafter, the log input 202 normalizes the inputted log data (Step 1115) and notifies the log file management 204 of the normalized log data (Step 1116). The normalization of the log data is performed by applying the format rules 510, 515 and the like as described above. After the log input 202 has transferred the normalized log data to the log file management 204, the log input 202 closes the log file and sets the timer for the next monitoring time in accordance with the monitoring interval.

Figure 28:
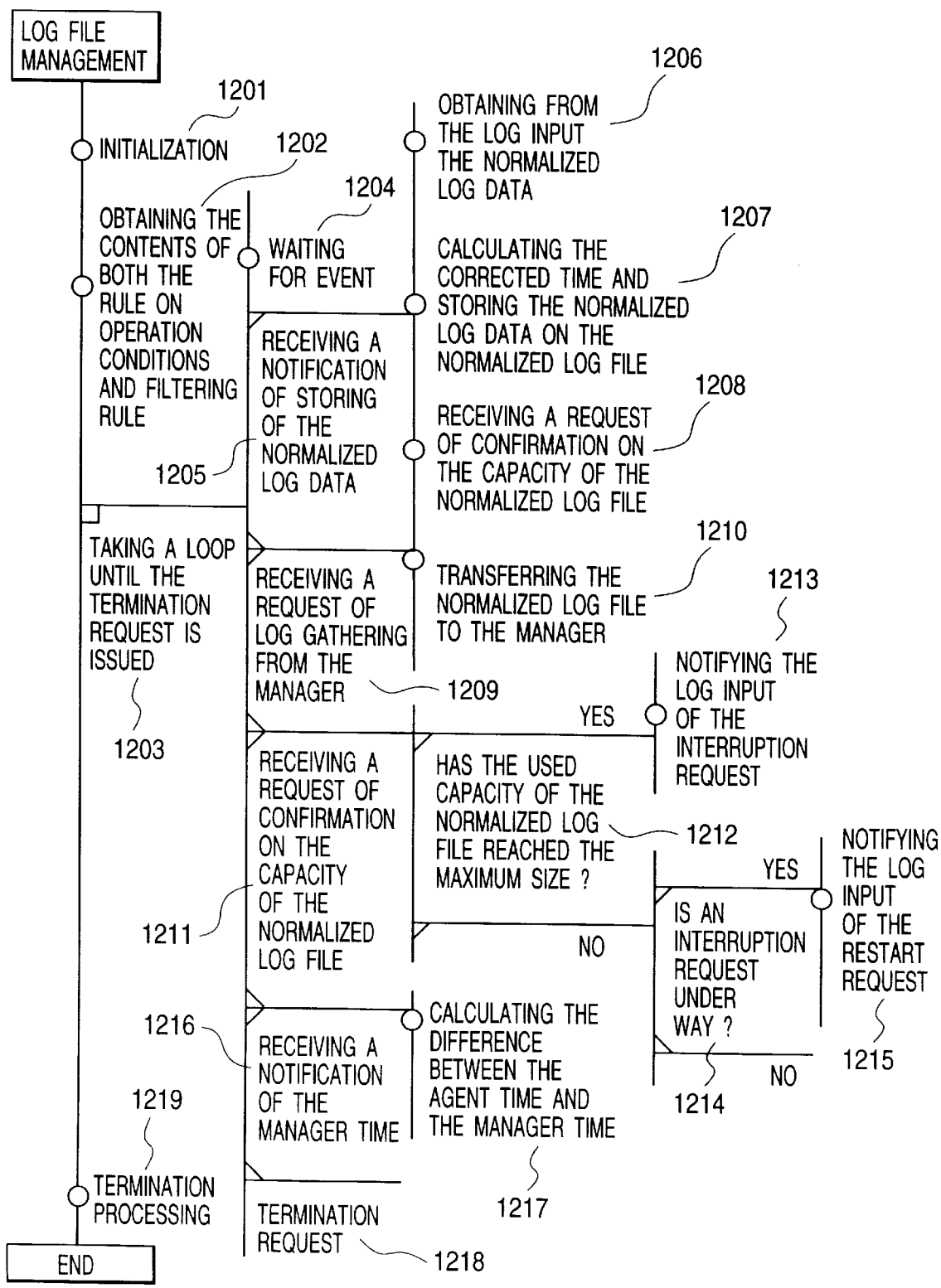
FIG. 28 is a PAD diagram showing the flow of processing of a log file management which is performed by the agent employed in the embodiment shown in FIG. 1.

FIG. 28 is a PAD diagram showing the flow of processing of the log file management 204 of the agent 20. The log file management 204 performs its initialization (Step 1201) and obtains a rule on operation conditions 470 and a filtering rule 520 from the rule management 203 (Step 1202). Thereafter, the log file management 204 takes a loop until a termination request is issued from the process management 201 (Step 1203) and waits for events (Step 1204). The events include a notification of storing of the normalized log data, which is issued from the log input 202 (Step 1205), a request for log gathering, which is issued from the log gathering 107 of the manager 10 (Step 1209), a request for confirmation on the capacity of the normalized log file, which is issued from the log file management 204 itself (Step 1211), a notification of the manager time issued from the log gathering 107 of the manager 10 (Step 1216), and a termination request issued from the process management 201 (Step 1218).

When the log file management 204 has received the notification of storing of the normalized log data (Step 1205), it obtains the normalized log data from the log input 202 (Step 1206) and calculates corrected times 323 from the difference between the agent time and the manager time (the result of processing in Step 1217) and a log output time 322. The log file management 204 adds the corrected times 323 to the normalized log data obtained from the log input 202 and causes the normalized log file 40 to store it therein (Step 1207). The log file management 204 applies the filtering rule 520 to the obtained normalized log data and causes the normalized log file 40 to store only the normalized log data that matches the conditions. Thereafter, the log file management 204 issues the request for confirmation on the capacity of the normalized log file (Step 1208).

When the log file management 204 has received the request for log gathering (Step 1209), it sorts the normalized log data in the normalized log file 40 in order of the corrected times 323 and thereafter transfers the result of sorting to the manager 10 given by MANAGER_ADDRESS 471 (Step 1210).

When the log file management 204 has received the request for confirmation on the capacity of the normalized log file (Step 1211), it compares the used capacity of the normalized log file with FILE_MAXSIZE 472 (Step 1212). When the used capacity of the normalized log file has reached the maximum size (if the answer is found to be YES in Step 1212), the log file management 204 issues an interruption notification to the log input 202 (Step 1213). When the used capacity of the normalized log file has not reached the maximum size (if the answer is found to be NO in Step 1212), the log file management 204 confirms whether it has issued an interruption request last time (Step 1214). When the log file management 204 has issued the interruption request (if the answer is found to be YES in Step 1214), the log file management 204 notifies the log input 202 of the restart request (Step 1215).

When the log file management 204 has received the notification of the manager time (Step 1216), it calculates the difference between the computer times of the agent and the manager (Step 1217).

When the log file management 204 has received the termination request (Steps 1218), it gets out of the loop and executes termination processing (Step 1219).

While the preferred embodiment of the present invention has been described above, the description of these is illustrated ones. It should be understood that modifications and changes from these description can be made without departing from the spirit and scope of the following claims.

What is claimed is:

1. A computer for gathering log data of said computer, comprising:

first storage means for storing an original log data thereon;

second storage means for storing a format rule that defines normalized data items to be extracted from the original log data;

third storage means for storing a normalized log data;

means for fetching said original log data from the first storage means;

means for extracting a set of character strings from said original log data and identifying each corresponding to said normalized data item to produce said normalized log data, said extracting being performed in accordance with the format rule stored in the second storage means;

means for outputting said normalized log data to the third storage means; and means for transferring said normalized log data stored in said third storage means to a specific computer.

2. A computer according to claim 1, wherein at least one of said computer and said specific computer includes means for arranging the normalized data items according to a predetermined order.

3. A computer program substantiated on a computer readable storage medium and having an agent function for gathering log data, comprising the following steps of:

(a) extracting a set of character strings from an original log data and identifying each corresponding to a normalized data item defined in a format rule to produce a normalized log data, said extracting being performed in accordance with said format rule;

(b) storing said normalized log data to a storage means; and (c) transferring the normalized log data from said storage means to a specific computer.

4. A computer program according to claim 3, further including the following step of:

arranging the normalized log data items according to a predetermined order.

5. A computer for gathering log data of said computer, comprising:

first storage means for storing an original log data thereon;

second storage means for storing a format rule that defines normalized data items to be extracted from the original log data;

third storage means for storing a normalized log data;

means for fetching said original log data from the first storage means;

means for extracting a set of character strings from said original log data and identifying each corresponding to said normalized data item to produce said normalized log data, said extracting being performed in accordance with said format rule stored in the second storage means;

means for adding corrected log data output times based on a standardized time;

means for outputting said normalized log data and the corrected log data output times to said third storage means; and means for transferring said normalized log data from the third storage means to a specific computer.

6. A computer according to claim 5, further including means for deleting the normalized log data when the difference between the corrected times added to the normalized log data and the present time of said specific computer has exceeded a predetermined preservation period.

7. A computer program substantiated on a computer readable storage medium and having an agent function for gathering log data, comprising the following steps of:

(a) extracting a set of character strings from an original log data and identifying each corresponding to a normalized data item defined in a format rule to produce a normalized log data, said extracting being performed in accordance with said format rule;

(b) adding corrected log data output times based on a standardized time;

(c) storing said normalized log data and the corrected log data output times in order to a storage means; and (d) transferring said normalized log data from said storage means to an external computer.

8. A method for gathering log data of a computer, comprising:

searching an original log data to determine a log classification of the log data and to pick up a set of character strings each as a normalized data item with its normalized name attached in accordance with a definition of a series of the normalized data items;

producing the normalized data item designating the log classification and a set of normalized data items from the set of character strings picked up;

arranging the normalized data items according to a predetermined order to produce a normalized log data;

storing said normalized log data to a storage means; and transferring said normalized log data from said storage means to an external entity.

9. A method for gathering log data in a computer system having a first computer executing a manager and a second computer executing an agent connected to each other through a network, said method comprising:

said agent correcting log output times recorded on a log data of the second computer by the times based on the manager's times;

sending the log data including the corrected log output times from said agent to said manager; and said manager storing the received log data on a log database of said first computer in order of the corrected log output times.

* * * * *